United States Patent [19]

Nimberger

[11] Patent Number: 5,503,180
[45] Date of Patent: Apr. 2, 1996

[54] VALVE HAVING EASILY REPLACEABLE SEAT

[75] Inventor: Spencer M. Nimberger, Houston, Tex.

[73] Assignee: PGI International, Ltd., Houston, Tex.

[21] Appl. No.: 432,515

[22] Filed: May 1, 1995

[51] Int. Cl.⁶ ................................................ F16K 43/00
[52] U.S. Cl. ............................ 137/315; 137/312; 251/86; 251/88; 251/214; 251/215; 251/363; 251/368
[58] Field of Search ............................... 137/315, 312; 251/86, 88, 214, 215, 360, 362, 363, 368

[56] References Cited

U.S. PATENT DOCUMENTS

| | | | |
|---|---|---|---|
| 222,217 | 12/1879 | Watson | 251/363 |
| 1,364,848 | 1/1921 | Walsh | 251/363 |
| 2,767,730 | 10/1956 | Laird | 251/363 |
| 2,841,167 | 7/1958 | Jacobson | 251/86 |
| 2,892,608 | 6/1959 | Collins | 251/86 |
| 3,107,082 | 10/1963 | Reynolds | 251/363 |
| 3,147,950 | 9/1964 | Milleville | 251/214 |
| 3,326,512 | 6/1967 | Clarke | 251/86 |
| 3,521,667 | 7/1970 | Johnson | 251/363 |

*Primary Examiner*—George L. Walton
*Attorney, Agent, or Firm*—John R. Kirk, Jr.; Jenkens & Gilchrist

[57] ABSTRACT

A valve has a seat that is replaceable without disassembly of the bonnet from the body or removal of the stem and closure member. The seat is maintained in a fixed position within the body of the valve by a single retainer member that is readily separable from the body. The seat and closure member are formed of hard, wear- and corrosion resistant materials and the valve has internally disposed seal members to prevent leakage around the seat and retainer. The valve is particularly useful for controllably conveying high pressure and high temperature fluids such as steam.

6 Claims, 2 Drawing Sheets

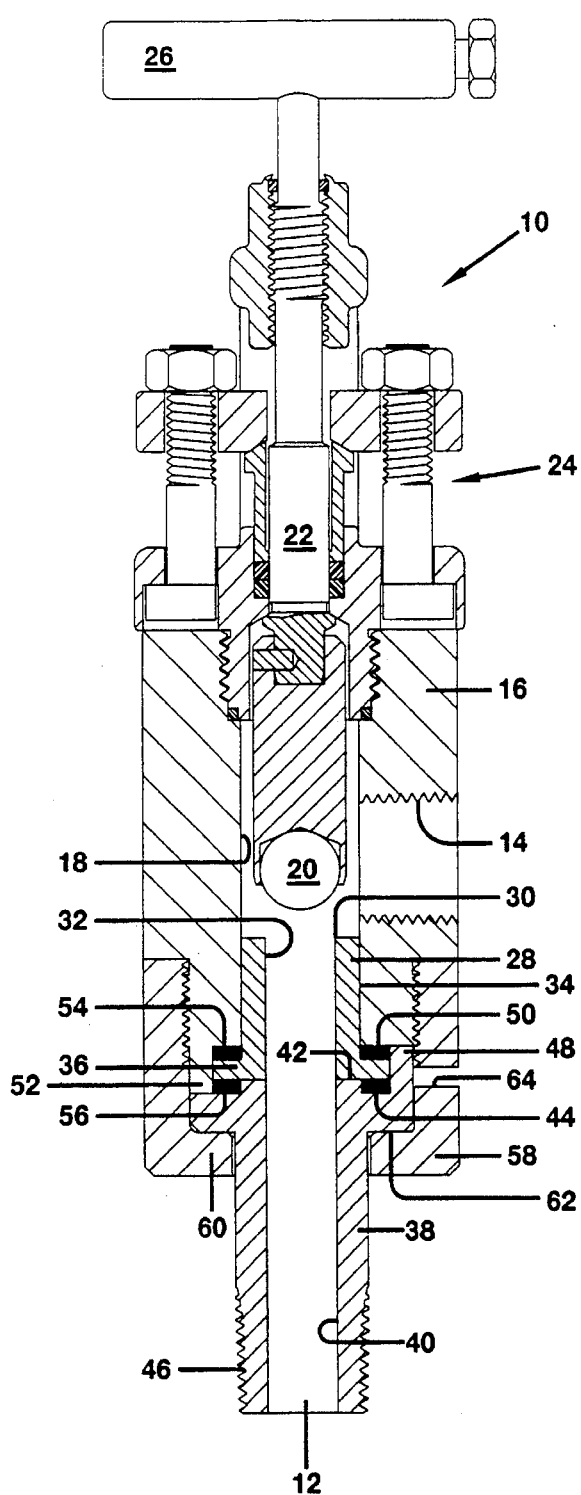
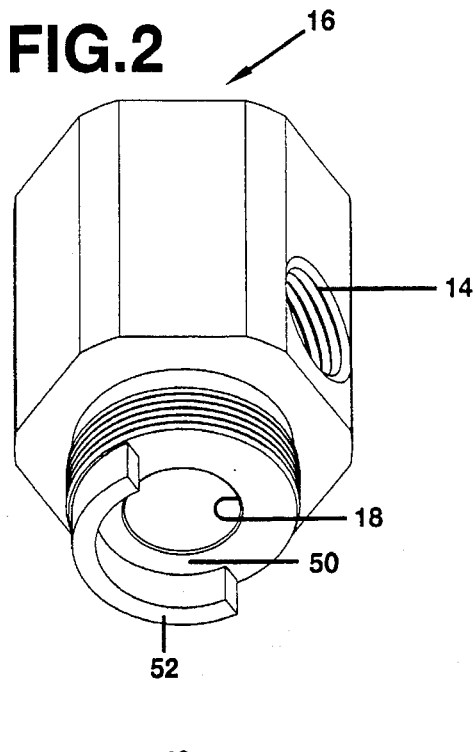
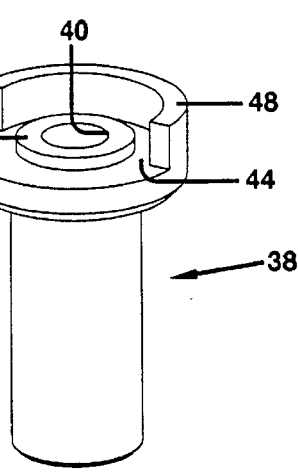

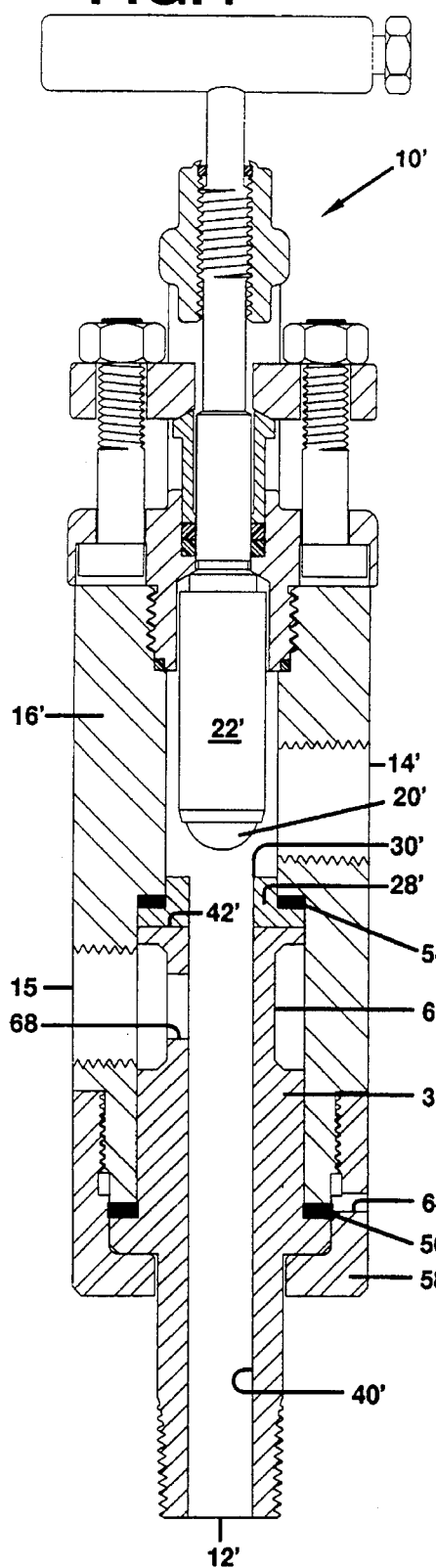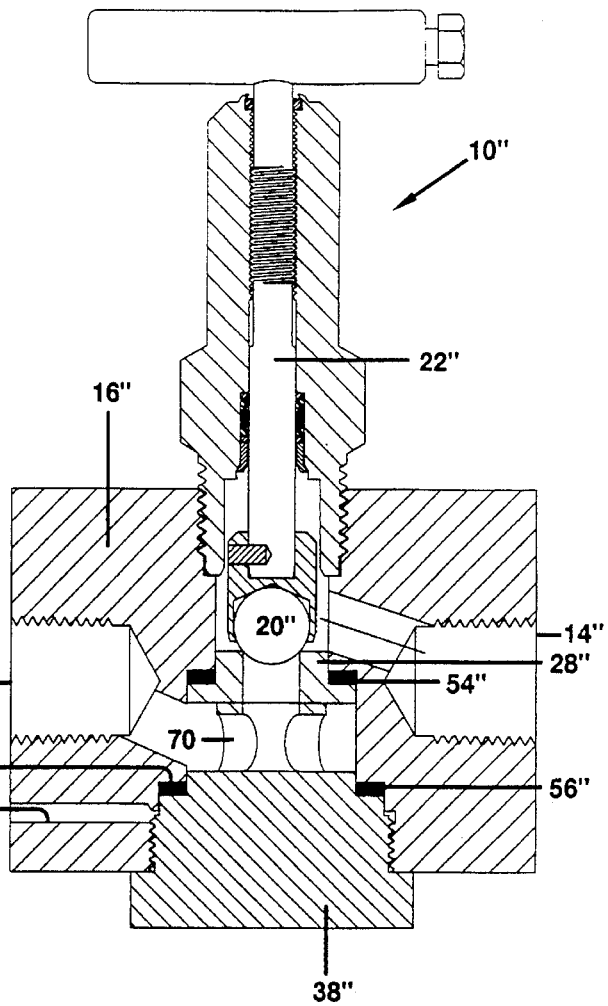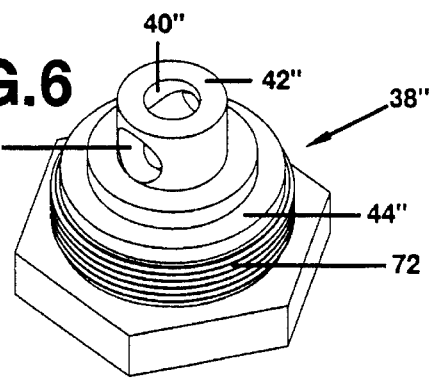

VALVE HAVING EASILY REPLACEABLE SEAT

TECHNICAL FIELD

This invention relates generally to flow control valves having a controllably moveable closure member, and more particularly to such a valve having an easily replaceable seat for receiving the closure member when the valve is closed.

BACKGROUND ART

Flow control valves used in high temperature and high pressure corrosive environment applications, such as high pressure steam lines carrying supersaturated steam which may be heated to temperature of 1000° F. (538° C.) and/or a pressure of 6,000 psi (41,370 kN/m$^2$), are particularly prone to corrosive wear and erosion of the seat which cooperates with a closure member to control fluid flow through the valve. When the seat becomes worn, the valve requires either replacement or disassembly and repair. Heretofore, the repair procedure generally required separation of the bonnet holding the stem and stem packing from the body, and removal of the stem and attached closure member, such as a disc, ball, or needle. In many chemical, petrochemical processing, refinery and similar industrial applications, the valves are often difficult to access. Furthermore, if the valve seats are resurfaced by grinding or machining, metal chips and burrs may be introduced into the fluid handling system, causing catastrophic damage to pumps, dynamic seals, and other small or zero clearance elements in the system.

One approach to providing a removable seat is disclosed in U.S. Pat. No. 4,773,442, issued Sept. 27, 1988 to Jean Lephilibert, for a GLOBE VALVE HAVING A DISMOUNTABLE SEAT FOR RAPID MAINTENANCE. To replace the valve seat in the Lephilibert valve, the bonnet, the compression means employed to bias the seat toward its desired position, the cage acting directly on the valve seat, the valve stem packing, the valve stem, and the closure member all are removed to access the seat. Thus, while Lephilibert's valve seat is removable, it requires virtually complete disassembly of the valve before the seat can be repaired, or removed and replaced.

A more easily removable valve seat is disclosed in U.S. Pat. No. 4,114,851 issued Sept. 19, 1978 to Shivak et al for a HIGH PRESSURE VALVE. In one embodiment, Shivak et al proposes incorporating the seat for the closure member as part of a removable fitting. When the valve seat becomes worn or damaged, the fitting is removed and replaced with a new fitting. The fitting, because it has the seat integrally formed therein, is a precision machined element of the valve assembly and therefore costly to produce. In another embodiment, the valve seat is integrally formed in the body of the valve and, if not repairable, requires replacement of the entire valve body.

Another removable valve seat is disclosed in U.S. Pat. No. 5,183,068 issued Feb. 2, 1993 to Albert Prosser for a BALL AND SEAT VALVE. The Prosser valve arrangement is suitable as an in-line check valve, but does not have a selectively moveable closure member. Furthermore, the Prosser valve arrangement does not provide a seal between the seat and the body to prevent internal leakage of fluid around the seat, nor a seal between the seat retaining member and the seat or the body to prevent external leakage.

The present invention is directed to overcoming the problems set forth above. It is desirable in high temperature and high pressure corrosive environments that the valve closure member not only mate with a seat to provide secure closure against fluid flow between the inlet and outlet ports, but also has an internal seal to prevent the leakage of fluid around the seat of the closure member. It is also desirable to have a seal between the retainer and either the seat or the valve body to prevent the external leakage of fluid from the valve assembly. Furthermore, it is desirable that the valve seat of a manually operated, selectively closeable valve, such as a root valve, blowdown vane or globe valve typically used in closely spaced, limited access applications, be easily removable or replaceable.

The present invention overcomes the above problems by providing a valve having an easily removable and replaceable seat that is formed of a hard, wear- and corrosion-resistant material, and is useful in high temperature and high pressure fluid conveyance systems. The valve embodying the present invention has a convenient valve seat retainer that is separable from the valve body without disassembly of any other elements of the valve. Furthermore the valve has a seal member positioned between the seat and body to prevent internal leakage around the valve seat when the valve is closed, and an additional seal member between the seat retainer and either the seat or valve body to prevent the external leakage of fluid from the valve.

DISCLOSURE OF THE INVENTION

In accordance with one aspect of the present invention, a valve for controlling the flow of fluid between an inlet port and at least one outlet port has a body with an internal bore, a bonnet attached to the body, and a closure member disposed within the bore of the body. A control rod, connected to the closure member, has a stem that extends through the bonnet and is selectively moveable to position the closure member between closed and selective open positions. A seat adapted to sealingly receive the closure member when the control rod is moved to position the closure member in the closed position, is formed of a hard, wear- and corrosion-resistant material and has an external cylindrical wall that extends into the bore in the body and a flange that extends radially outwardly from the external cylindrical wall. The seat is removable from the body without disassembly of the bonnet from the body, or removal of the control rod and closure member. The valve has a seat retainer which has an internal bore that is in fluid communication with the valve's inlet port and is coaxially aligned with the internal bore in the body. The seat retainer also has a planar seat support surface that extends in a direction normal to the internal bore in the retainer and is in biased abutting contact with the seat. The seat retainer also has a circumferentially disposed seal. The valve also includes a first seal member that is disposed between the flange of the removable seat and the body, and a second seal member disposed between the circumferentially disposed seal seat of the seat retainer and either the seat or body of the valve.

Another feature, illustrated in one arrangement of the valve embodying the present invention, includes an annular segment that extends outwardly from the seal seat of the seat retainer and another annular segment that extends outwardly from the seal seat of the body. The two annular segments cooperate to align the seat retainer with the body and prevent rotation of the retainer with respect to the seat or body during assembly or removal of the seat retainer from the body.

Other features of the valve embodying the present invention include the closure member having a ball shape, and the ball and the valve seat both being formed of a hard, wear- and corrosion-resistant material.

BRIEF DESCRIPTION OF THE DRAWINGS

FIG. 1 is a sectional view of a root valve embodying the present invention, with the handle, closure member, and a portion of the stem shown in elevation;

FIG. 2 is a perspective view of the body of the root valve shown in FIG. 1, as observed from a position somewhat below and to the right of the valve as aligned in FIG. 1;

FIG. 3 is a perspective view of the seat retainer of the root valve shown in FIG. 1, as observed from a position slightly above and to the left of the valve as aligned in FIG. 1;

FIG. 4 is a sectional view of a blowdown valve illustrating an alternative embodiment of the present invention, with the handle, stem, and closure member shown in elevation;

FIG. 5 is a sectional view of a globe valve illustrating another alternative embodiment of the present invention, with the handle, stem, and closure member shown in elevation; and FIG. 6 is a perspective view of the seat retainer of the globe valve shown in FIG. 5, as observed from above and to the right of the valve as aligned in FIG. 5.

BEST MODE FOR CARRYING OUT THE INVENTION

In the preferred embodiment of the present invention a root valve 10, i.e., a valve constructed for use as the first, or base, valve in a multiple component branch off of a primary pressure line, and has a single inlet port 12 and a single outlet port 14. The valve 10 has a body 16 with an internal bore 18 that is in fluid communication with the outlet port 14 and houses a closure member 20, such as a ball element. The ball element 20 is attached to one end of a control rod 22, more commonly referred to as a stem, that extends from the body 16 upwardly through a bonnet 24 to a control handle 26. The bonnet 24, depending on fluid pressure and temperature requirements, may have an outside seal and yoke (OS & Y) configuration as shown in FIG. 1, or alternatively may be a conventional bonnet with internally disposed packing elements. The closure member 20 is attached to the lower end of the control rod 22, and is axially moveable in response to rotation of the handle 26 to selectively position the closure member 20 at a closed position. At the closed position, the flow of fluid through the valve 10 is blocked. Opening the closure member, either partially for fully, controllably regulates the volumetric flow of fluid through the valve 10. Preferably, the closure member 20 is formed of a hard, wear- and corrosion-resistant ceramic material such as silicon carbide, silicon nitride, alumina or zirconia.

The valve 10 includes a removable seat member 28 having a surface 30 shaped to mate with the closure member 20, and an internal bore 32 that is in fluid communication with the inlet port 12. The surface 30 sealingly receives the closure member 20 and blocks the flow of fluid from the internal bore 32 when the control rod 22 is moved to positioned to closure member 20 at the closed position. Preferably, the seat member 28 is formed of a hard, wear- and corrosion-resistant metal alloy such as stellite, a family of nonferrous alloys having a composition of, by weight, from about 20% to 65% cobalt, from about 11% to 32% chromium, and from about 2% to 5% tungsten. Alternatively, the seat member 28 may be formed of stainless steel with a hard coating of stellite or similar hard, wear- and corrosion-resistant material deposited on the surface, particularly in the area of the mating surface 30. The removable seat member 28 has an external cylindrical wall portion 34 that extends into the bore 18 in the body 16, and a flange 36 that extends radially outwardly from the cylindrical wall 34.

Importantly, as will now be described in more detail, the seat member 28 is removable from the body without disassembly of the bonnet 24 from the body 16 or removal of the control rod 22 and the closure member 20 from the body 16. The seat member 28 is maintained in its desired position within the body 16 by a separable seat retainer 38 that has an internal bore 40 in fluid communication with the inlet port 12 and the internal bore 32 in the seat member 28. The seat retainer 38 has a planar seat support surface 42, disposed at its upper end as seen in FIGS. 1 and 3, that extends in a direction normal to the internal bore 40 and, upon assembly, is biased into abutting contact with the seat member 28. The upper end of the seat retainer 38 also has a circumferentially disposed seal seat 44 that is radially spaced outwardly of the seat support surface 42. The lower end of the seat retainer 38 is provided with conventional NPT tapered pipe threads 48, or other means, for connecting the valve 10 to a pipe or other element in a fluid system. In high pressure/temperature applications the threaded connection is typically sealed by a weldment after initial installation.

In the preferred embodiment of the present invention, the seat retainer 38 has an upwardly extending margin, or annular segment, 48 that, as best shown in FIG. 3, extends outwardly from the face of the seal seat 44 on the retainer 38 in a direction concentrically aligned with the bore 40 of the retainer 38, and is radially spaced outwardly of the seat support surface 42. As best shown in FIG. 2, the lower end of the body 16 also has a seal seat 50 extending radially outwardly from the bore 18 of the body 16, and an annular segment 52 extending outwardly from the seal seat 50 in a direction concentrically aligned with the bore 18. The annular segment 48 of the retainer 38 and the annular segment 52 of the body 16 have the same height and length and cooperate to provide positive alignment, or indexing, of the retainer 38 with the body 16 whereby rotation of the retainer 38 is prevented during assembly. Also, the annular segments 48,52 maintain the retainer 38 and body 16 in a predetermined fixed radial relationship with each other after assembly. Alternatively, the annular segments 52,48 may be of unequal length wherein a short segment, similar to an index tab, one member mates with a slot provided in an otherwise continuous circular segment on the other member.

Importantly, the valve 10 embodying the present invention, has a first seal member 54 positioned between the radial flange 36 of the seat 28 and the seal seat 50 of the body 16 to prevent the undesirable leakage of fluid around the seat 28. To prevent external leakage between the internal bore 40 of the retainer 38 and the body 16, a second seal member 56 is disposed between the circumferentially disposed seal seat 44 of the retainer 38 and the seat member 28. Depending on the specific operating environment requirements, the first and second seal members may be conventional compression seals, or for high pressure/temperature applications, a commercially available proprietary seal specifically constructed for such use.

In the preferred embodiment of the present invention, the seat retainer 38 is conveniently attached to the body 16 of the valve 10 by a threaded nut 58. The nut 58 has a radially inwardly extending flange 60 that abuts a shoulder 62 on the retainer 38. Tightening the nut 58 onto threads provided on the body 16 provides a bias force to assure positive abutment of the seat support surface 42 of the retainer 38 against the seat member 28. The nut 58 is tightened until its distal end forcibly abuts a shoulder formed in the body 16, at which position the first and second seal members 54,56 are controllably compressed between the respective opposed surfaces of the body 16, the seat 28 and seat retainer 38. Desirably, the nut 58 has a weep hole 64 provided between the threads and valve exterior to permit the controlled release of pressurized fluid and thereby provide a signal that the line has not been properly relieved of pressure preparatory to removal of the retainer 38, and further serve as an indicator of possible leakage around one or both of the seal member 54,56.

An alternative embodiment of the present invention is shown in FIG. 4. For the sake of convenience, elements of the invention identified above with respect to the preferred embodiment are identified in the drawing and the following discussion with a prime (') mark added after the previously assigned reference number. In this embodiment, a blowdown valve 10' has an additional outlet port 15 provided in the body 16' that is in fluid communication with the internal bore 40' of the seat retainer 38' by way of an annular recess 66 formed about a peripheral portion of the retainer 38' and an internal port 68 extending between the annular recess 66 and the internal bore 40'. Thus, fluid flow from the inlet port 12' to the second outlet port 15 is not controlled by the blowdown valve 10'. In steam systems, the blowdown valve 10' is opened to drain condensate from the system through the outlet port 14'.

Another alternative embodiment of the present invention is shown in FIGS. 5 and 6, in which previously discussed elements are designated with a double prime (") mark after the previously assigned reference number. In this embodiment, a globe valve 10" has an inlet port 12" through one side of the body 16" that is in fluid communication with the internal bore 40" of the seat retainer 38" by way of a pair of internal ports 70 extending between the outside wall of the retainer 38" and the internal bore 40". In this arrangement, the seat retainer 38" has external threads 72, formed about its periphery, that mate with threads provided in a lower portion of the body 16". Also, in this alternative embodiment, the second seal member 56" is disposed between the seal seat 44" on the retainer 38" and a second seal seat 74 provided on the body 16. Furthermore, since a capture nut is not required in this arrangement, the weep hole 64" extends laterally through the body 16".

Industrial Applicability

The valve 10 embodying the present invention is useful in high pressure and high temperature fluid systems, such a steam conveyance systems, and is particularly useful in such applications where access to the valves in limited or difficult. The valve 10 is readily serviceable, having an easily replaceable seat 28 that can be removed without disassembly of the valve other than separation of the body 16 and a single retainer 38. The removable seat member 28 is supported by a planar surface on the seat retainer 38 that is in biased abutting contact with the seat 28. Furthermore, the valve 10 avoids the costly and complex construction of previously proposed valves having removable seats.

Importantly, the removable seat 28 and the closure member 20 received in the seat are respectively formed of hard, wear- and corrosion-resistant materials such as stellite alloys and ceramics. Also, the valve 10 has seal members 54,56 that seal against internal leakage around the removable seat 28 and external leakage around the seal retainer 38.

Other aspects, features and advantages of the present invention can be obtained from a study of this disclosure together with the appended claims.

What is claimed is:

1. A valve for controlling the flow of fluid between an inlet port and at least one outlet port, said valve comprising:

a body having an internal bore in fluid communication with said at least one outlet port, a seal seat extending radially outwardly from said bore, and an annular segment extending outwardly from the seal seat of said body and concentrically disposed with respect to the internal bore of said body;

a bonnet attached to said body;

a closure member disposed within the bore in said body;

a control rod connected to said closure member and having a stem portion extending through said bonnet, said control rod being selectively moveable to position said closure member at a closed position whereat a flow of fluid through said valve is blocked, and a selected open position whereat the volumetric flow rate of fluid through said valve is controllably regulated;

a seat having a construction adapted for sealingly receiving said closure member in response to moving the control rod to position the closure member at said closed position, said seat being formed of a hard, wear- and corrosion-resistant material and having an externally disposed cylindrical wall portion extending into said bore in the body and a flange portion extending radially outwardly from the cylindrical wall portion, said seat being removable from said body without disassembly of said bonnet from the body and removal of said control rod and said closure member;

a seat retainer separably attached to said body and having an internal bore in fluid communication with said inlet port and coaxially aligned with the internal bore in said body, a planar seat support surface extending in a direction normal to the internal bore of said seat retainer and in biased abutting contact with said seat, a circumferentially disposed seal seat, and an annular segment extending outwardly from the seal seat of said seat retainer and concentrically disposed with respect to the internal bore of said retainer, said annular segments of the seat retainer and the body cooperating to align the seat retainer and the body in a predetermined fixed radial relationship with respect to each other whereby rotation of said seat retainer with respect to said body is prevented during assembly and separation of said retainer and body, and operation of said valve;

a first seal member disposed between the flange portion of the removable seat and the seal seat of said body; and a second seal member disposed between said seal seat of the seat retainer and one of said seat and said body.

2. A valve, as set forth in claim 1, wherein said valve includes a nut having an inwardly extending radial flange and is threadably mounted on said body, and said seat retainer has a shoulder disposed on an outer surface thereof, said seat retainer being maintained in a predetermined fixed relationship with respect to said body by forced abutment of the radial flange of said nut against said shoulder disposed on the outer surface of said seat retainer.

3. A valve, as set forth in claim 1, wherein said closure member is a ball member formed of a hard, wear- and corrosion-resistant ceramic material.

4. A valve, as set forth in claim 1, wherein said seat is formed of a hard, wear- and corrosion-resistant metallic material.

5. A valve, as set forth in claim 4, wherein said hard, wear- and corrosion-resistant metallic material has a composition comprising, by weight percent, from about 20% to about 65% cobalt, from about 11% to about 32% chromium, and from about 2% to about 5% tungsten.

6. A valve, as set forth in claim 1, wherein said seat comprises a body formed of stainless steel and a hard wear- and corrosion-resistant coating disposed on at least a portion of said stainless steel body, said coating having a composition comprising, by weight percent, from about 20% to about 65% cobalt, from about 11% to about 32% chromium, and from about 2% to about 5% tungsten.

\* \* \* \* \*